(12) United States Patent
Cornwall et al.

(10) Patent No.: US 8,493,232 B2
(45) Date of Patent: Jul. 23, 2013

(54) GAS SHUT-OFF VALVE WITH FEEDBACK

(75) Inventors: Mark K. Cornwall, Spokane, WA (US); Barry Cahill-O'Brien, Spokane, WA (US); Joseph Paolino, Spokane Valley, WA (US)

(73) Assignee: Itron, Inc., Liberty Lake, WA (US)

( * ) Notice: Subject to any disclaimer, the term of this patent is extended or adjusted under 35 U.S.C. 154(b) by 457 days.

(21) Appl. No.: 12/892,985

(22) Filed: Sep. 29, 2010

(65) Prior Publication Data

US 2011/0074602 A1    Mar. 31, 2011

Related U.S. Application Data

(60) Provisional application No. 61/247,066, filed on Sep. 30, 2009.

(51) Int. Cl.
*G08B 23/00*    (2006.01)
(52) U.S. Cl.
USPC ............. 340/870.02; 340/870.03; 318/566; 251/129.01; 251/129.15
(58) Field of Classification Search
USPC ................. 340/870.02–870.03; 251/129.01, 251/129.15; 318/566
See application file for complete search history.

(56) References Cited

U.S. PATENT DOCUMENTS

| | | | |
|---|---|---|---|
| 1,139,956 A | 5/1915 | Craft | |
| 1,958,159 A | 5/1934 | Bresson | |
| 2,021,041 A | 11/1935 | Altamura | |
| 2,558,188 A | 6/1951 | McWilliams | |
| 2,699,177 A | 1/1955 | Wingfield | |
| 2,903,540 A | 9/1959 | Gloviak et al. | |
| 2,931,876 A | 4/1960 | Weinfurt | |
| 3,346,710 A | 10/1967 | Weston et al. | |
| 3,378,663 A | 4/1968 | Abramowitz | |
| 3,381,105 A | 4/1968 | Mortenson | |
| 3,632,935 A | 1/1972 | Stegmaier | |
| 3,689,856 A | 9/1972 | Lambert et al. | |
| 3,751,618 A | 8/1973 | Hallerberg | |
| 3,842,228 A | 10/1974 | Green | |

(Continued)

FOREIGN PATENT DOCUMENTS

| | | |
|---|---|---|
| CH | 281257 | 2/1952 |
| DE | 619902 | 10/1935 |

(Continued)

OTHER PUBLICATIONS

International Search Report for PCT International Application No. PCT/US2009/045554 mailed Jul. 29, 2009.

(Continued)

*Primary Examiner* — Albert Wong
(74) *Attorney, Agent, or Firm* — Dority & Manning, P.A.

(57) ABSTRACT

Disclosed are apparatus and methodology for providing a feedback mechanism to a system operator that provides a positive indication of the position of a valve which controls gas flow to a consumer. Rotation of a stepper motor controlling a valve mechanism is optically monitored and a feedback signal is sent to the system operator indicating positive operation of the valve only when a selected number of rotations of the stepper motor is reported. The stepper motor may be operated in different modes, each associated with different nominal current consumption levels. In a higher current consumption mode, such as a torque-oriented mode, the stepper motor may be stepped a few additional steps after valve closure to ensure seating of the valve.

18 Claims, 2 Drawing Sheets

U.S. PATENT DOCUMENTS

| | | | |
|---|---|---|---|
| 3,902,032 A | 8/1975 | Koepke |
| 4,006,323 A | 2/1977 | Nelson et al. |
| 4,087,669 A | 5/1978 | Sauer |
| 4,178,572 A | 12/1979 | Gaskill et al. |
| 4,230,388 A | 10/1980 | Thierry et al. |
| 4,240,030 A | 12/1980 | Bateman et al. |
| 4,309,581 A | 1/1982 | Macaire et al. |
| 4,321,436 A | 3/1982 | McGarrity |
| 4,357,509 A | 11/1982 | Adlerteg |
| 4,412,116 A | 10/1983 | Golub |
| 4,490,593 A | 12/1984 | Cook |
| 4,550,232 A | 10/1985 | Lemmer |
| 4,562,323 A | 12/1985 | Belbel et al. |
| 4,597,619 A | 7/1986 | Reimer |
| 4,621,303 A | 11/1986 | Rowe |
| 4,801,772 A | 1/1989 | Bratkowski et al. |
| 4,866,633 A | 9/1989 | Nakane et al. |
| 5,021,760 A | 6/1991 | Krubsack et al. |
| 5,045,969 A | 9/1991 | Menasco |
| 5,209,454 A | 5/1993 | Engdahl et al. |
| 5,227,750 A | 7/1993 | Connell et al. |
| 5,296,660 A | 3/1994 | Morel et al. |
| 5,296,662 A | 3/1994 | Engdahl et al. |
| 5,546,269 A | 8/1996 | Robinson et al. |
| 5,572,396 A | 11/1996 | Robinson |
| 5,575,309 A | 11/1996 | Connell |
| 5,583,471 A | 12/1996 | Weiser et al. |
| 5,586,913 A | 12/1996 | Robinson et al. |
| 5,608,598 A | 3/1997 | Dieppedalle et al. |
| 5,668,538 A | 9/1997 | Warwick |
| 5,673,331 A * | 9/1997 | Lewis et al. ............... 382/100 |
| 5,694,099 A | 12/1997 | Connell et al. |
| 5,748,104 A | 5/1998 | Argyroudis et al. |
| 5,821,481 A | 10/1998 | Neubauer |
| 5,853,305 A | 12/1998 | Bedrossian et al. |
| 5,886,860 A | 3/1999 | Chen et al. |
| 5,920,265 A | 7/1999 | Johnson et al. |
| 5,952,739 A | 9/1999 | Grass et al. |
| 6,000,931 A | 12/1999 | Tanabe et al. |
| 6,034,585 A | 3/2000 | Donhauser |
| 6,046,660 A | 4/2000 | Gruner |
| 6,046,661 A | 4/2000 | Reger et al. |
| 6,056,008 A | 5/2000 | Adams et al. |
| 6,080,949 A | 6/2000 | Weber et al. |
| 6,104,586 A | 8/2000 | Robinson |
| 6,246,306 B1 | 6/2001 | Gruner |
| 6,252,478 B1 | 6/2001 | Gruner |
| 6,292,075 B1 | 9/2001 | Connell et al. |
| 6,320,485 B1 | 11/2001 | Gruner |
| 6,437,692 B1 | 8/2002 | Petite et al. |
| 6,441,332 B1 | 8/2002 | Crawford et al. |
| 6,470,903 B2 | 10/2002 | Reyman |
| 6,513,545 B2 | 2/2003 | Rhone et al. |
| 6,520,798 B1 | 2/2003 | Robinson et al. |
| 6,563,409 B2 | 5/2003 | Gruner |
| 6,600,931 B2 | 7/2003 | Sutton et al. |
| 6,661,319 B2 | 12/2003 | Schmelz |
| 6,788,176 B2 | 9/2004 | Schmelz |
| 6,892,751 B2 | 5/2005 | Sanders |
| 6,906,637 B2 * | 6/2005 | Martin ..................... 340/870.02 |
| 6,925,891 B2 | 8/2005 | Suginouchi et al. |
| 6,994,309 B2 | 2/2006 | Fernández-Sein |
| 7,049,932 B2 | 5/2006 | French et al. |
| 7,049,975 B2 * | 5/2006 | Vanderah et al. ........ 340/870.02 |
| 7,064,671 B2 | 6/2006 | Vanderah et al. |
| 7,069,161 B2 | 6/2006 | Gristina et al. |
| 7,088,239 B2 | 8/2006 | Basinger et al. |
| 7,091,878 B2 | 8/2006 | Holle et al. |
| 7,116,243 B2 | 10/2006 | Schleich et al. |
| 7,130,722 B2 | 10/2006 | Soni |
| 7,228,726 B2 | 6/2007 | Kates |
| 7,262,709 B2 | 8/2007 | Borleske et al. |
| 7,265,652 B2 | 9/2007 | Ying |
| 7,271,987 B1 | 9/2007 | Zhang et al. |
| 7,298,288 B2 | 11/2007 | Nagy et al. |
| 7,362,232 B2 | 4/2008 | Holle et al. |
| 7,412,876 B2 | 8/2008 | Kates |
| 7,458,387 B2 | 12/2008 | McGill |
| 7,458,846 B2 | 12/2008 | Loehr et al. |
| 7,833,034 B2 | 11/2010 | Connell |
| 7,880,641 B2 | 2/2011 | Parris et al. |
| 8,040,664 B2 | 10/2011 | Makinson et al. |
| 8,054,199 B2 | 11/2011 | Addy |
| 8,176,936 B2 | 5/2012 | Naganuma et al. |
| 8,269,651 B2 | 9/2012 | Zigdon et al. |
| 8,395,464 B2 | 3/2013 | Pontin et al. |
| 2001/0010032 A1 | 7/2001 | Ehlers et al. |
| 2002/0030604 A1 | 3/2002 | Chance et al. |
| 2002/0050885 A1 | 5/2002 | Gruner |
| 2005/0162149 A1 | 7/2005 | Makinson et al. |
| 2005/0174256 A1 | 8/2005 | Berg |
| 2006/0031180 A1 | 2/2006 | Tamarkin et al. |
| 2006/0066425 A1 | 3/2006 | Gruner |
| 2006/0278269 A1 | 12/2006 | McGill |
| 2007/0211768 A1 | 9/2007 | Cornwall et al. |
| 2008/0177678 A1 | 7/2008 | Di Martini et al. |
| 2008/0219210 A1 | 9/2008 | Shuey et al. |
| 2008/0290986 A1 | 11/2008 | Laughlin-Parker et al. |
| 2011/0000310 A1 | 1/2011 | Yokohata et al. |
| 2011/0074601 A1 | 3/2011 | Cornwall |

FOREIGN PATENT DOCUMENTS

| | | |
|---|---|---|
| DE | 1753688 | 10/1957 |
| EP | 0532586 | 4/1996 |
| EP | 0714549 | 5/1998 |
| EP | 0643813 | 6/1998 |
| GB | 1384294 | 2/1975 |
| WO | WO 91/19314 | 12/1991 |
| WO | WO 94/23230 | 10/1994 |
| WO | WO 95/05671 | 2/1995 |
| WO | WO/98/40898 | 9/1998 |
| WO | WO 03/046936 | 6/2003 |
| WO | WO 03/049129 | 6/2003 |
| WO | WO 2005/106907 | 11/2005 |
| WO | WO 2006/024855 | 3/2006 |
| WO | WO 2006/035235 | 4/2006 |
| WO | WO 2009/110192 | 9/2009 |

OTHER PUBLICATIONS

Machine translation of DE 619902 listed above.
Machine translation of CH 281257 listed above.
BLP, "X-Pulse: Introducing the New Residential Total Disconnect/Reconnect System", Power & Utilities brochure.
Thomas E. Browne, Jr., Editor; "Circuit Interruption Theory and Techniques", Westinghouse Research and Development Center, Pittsburgh, Pennsylvania, Copyright 1984 by Marcel Dekker, Inc.
Slade, *Electric Contact Phenomena*, pp. 586-593.
PCT International Search Report for PCT International Application No. PCT/US2009/045555 mailed Jul. 20, 2009.
PCT International Search Report for PCT International Application No. PCT/US2010/050383 dated Nov. 18, 2010.
PCT Written Opinion of the International Searching Authority for PCT International Application No. PCT/US2010/050383 dated Nov. 18, 2010.
David J. Southern P.E., Product Development Manager, FreeWave Technologies, Inc., "Operators Extend SCADA Investment to Vital Cathodic Protection", pp. 16-17 of *Remote Site & Equipment Management Magazine*, Jun./Jul. 2008.
Feb. 26, 2013 Office Action issued in U.S. Appl. No. 12/892,235.
Mar. 13, 2013 Office Action issued in U.S. Appl. No. 12/891,857.

\* cited by examiner

Figure 1

Figure 2

GAS SHUT-OFF VALVE WITH FEEDBACK

PRIORITY CLAIM

This application claims the benefit of previously filed U.S. Provisional Patent Application entitled "GAS SHUT-OFF VALVE WITH FEEDBACK," assigned U.S. Ser. No. 61/247,066, filed Sep. 30, 2009, and which is incorporated herein by reference for all purposes.

FIELD OF THE INVENTION

The present subject matter relates to valves. More particularly, the present subject matter relates to gas shut-off valves with a valve position feedback mechanism.

BACKGROUND OF THE INVENTION

Utility companies perform a critically important task of providing needed commodities such as electrical power, gas, water, and others to businesses and households. Such commodities not only make possible desired comfort but provide a truly fundamental cornerstone of modern living. In turn, processes have evolved in response to demand/need for ever increasing efficient reading and interaction with meters installed at such locations, to facilitate requisite and appropriate billing for the services of providing such commodities. Such efforts have more recently evolved from expensive, time-consuming personnel-intensive efforts, requiring on-site inspection and/or handling of meter issues and related concerns, to relatively more remotely controlled events and servicing.

The need for such "remote" activities, whether meter reading or adjunct meter and/or commodities management, have grown both in scope and type. In other words, not only is it desired to remotely detect meter readings and conduct activities adjunct thereto, but also to detect and manage equipment malfunctions, whether occurring naturally (such as storm related), or occurring intentionally (such as in meter tampering or commodities theft). It is also highly desirable to provide systems and controls which can prevent problems before they happen and/or provide relatively early detection and effective management.

In many instances, the prospect of equipment malfunction (whether through tampering, accidents, or longevity/maintenance failures) can raise serious safety issues inherent to the commodities being delivered/managed on-site. For example, emergencies may arise due to gas leakages, or fires, whether originated from gas, electrical, or other sources. In fact, a number of potential safety problems are well known in the industry. Accordingly, management and control of metering systems and related delivering a variety of commodities remains an important area of interest from a safety perspective, particularly as industry and societal needs drive requirements for ever-increasing remotely-based activities/management.

Various patents and patent applications provide disclosures directed to gas or fluid metering or distribution systems that may include aspects relating to shut off valve control or management. For example, U.S. Pat. No. 7,088,239 to Basinger et al. discloses an apparatus for routine monitoring and automatic reporting of electrical power and gas utility usage that also provides means for detecting and reporting to the relevant utility companies the development of local hazards on premises at which one or more utility usage meters are installed. The system includes a remote computer capable of turning on or off the supply of gas at the meter, perhaps as a result of the utility user not having made timely payments for the usage of gas. The meter has the capability to send a return or confirmation signal to the remote computer to confirm that the supply of gas has been shut off.

U.S. Pat. No. 6,892,751 to Sanders discloses a building protection system, involving the transmission of signals to LED's to indicate whether the shutoff valve is in the open or closed position. U.S. Pat. No. 6,470,903 to Reymann discloses an automatically actuated regulation system for a natural gas pipeline, which involves reporting the position of a shutoff valve, whether open or closed, to the utility through a signal.

U.S. Pat. No. 6,000,931 to Tanabe et al. discloses a gas safety control system for supplying a gas that is forwarded from a gas supply source through an inspection meter to one or more gas appliances, involving the output of cutoff information indicating that the supply of gas is cut off by a cut off valve. U.S. Patent Application Publication No. 2006/0278269 to McGill discloses a safety valve that is positioned in supply plumbing that supplies a fluid medium such as natural gas to a point of use structure such as a home. A mechanical actuator is provided remote from the safety valve but mechanically connected to the safety valve. The mechanical actuator can be actuated by seismic disturbance, manually, or by activation by remote sensor or home security system. The actuator provides a status viewer for viewing the status of the valve (either ON or OFF). The system does not transmit the status indicator to a remote location.

The disclosures of all such patent related publications referenced herein are fully incorporated herein by reference for all purposes.

While various implementations of gas shut-off valves have been developed, and while various combinations of status indicating systems have been developed, no design has emerged that generally encompasses all of the desired characteristics as hereafter presented in accordance with the subject technology.

SUMMARY OF THE INVENTION

In view of the recognized features encountered in the prior art and addressed by the present subject matter, improved methodology advantageously provides features for monitoring and controlling the flow of a commodity, such as natural gas. More specifically, present subject matter may provide a positive indication of valve position in a gas distribution system.

Briefly, the technology of interest pertains to a utility meter with the capability of remotely shutting off the flow of gas. Feedback may be taken and reported on the position of the cut off valve so that failure to close as commanded is reported. Confirmation of actual closure is also reported, along with any determined tampering. Thus, more generally, the technology of interest pertains to providing remote disconnect meter features such as a remote disconnect that is built into a gas meter, and/or a gas shut-off valve inside a gas meter with feedback for valve status including failure of the valve to close properly.

In one present exemplary configuration, a feedback mechanism is provided that provides an indication of the valve position status.

In one of their simpler forms, valve status indication may alert a gas supply operator of valve positioning failure.

Another positive aspect of the presently disclosed type of device is that differing modes of operation may be employed to operate the valve positioning mechanism in order to advantageously maximize associated battery life in present embodiments incorporating battery-based features.

In accordance with aspects of certain embodiments of the present subject matter, methodologies are provided to provide different operating modes for a stepper motor to operate a gas valve between open and closed positions.

In accordance with certain aspects of other embodiments of the present subject matter, methodologies have been developed to initiate operation of a gas valve in a first mode to unseat the valve and to then switch to a second mode to save battery life.

In accordance with yet additional aspects of further embodiments of the present subject matter, apparatus and accompanying methodologies have been developed to insure that an associated stepper motor completes a predetermined number of steps to insure positive operation of a valve operated by such stepper motor.

In accordance with yet still further aspects of still further embodiments of the present subject matter, methodologies have been developed to ensure that a valve is closed by adding a predetermined number of stepper motor operations in a torque mode to seat the valve.

According to yet still other aspects of additional embodiments of the present subject matter, apparatus and methodologies have been developed to optically observe operation of an associated stepper motor.

It should be appreciated by those of ordinary skill in the art from the complete disclosure herewith that the present subject matter is intended to equally encompass both devices and associated methodologies.

One present exemplary embodiment of the present subject matter relates to an advanced meter reading system for transmitting between user locations and a centralized data collection facility data and commands related to utility usage and utility supply connections. Such a presently exemplary system preferably may comprise a plurality of utility metrology means and associated endpoint devices, situated at respective locations of utility consumption, for bidirectional communications for transmitting utility consumption data associated with a respective location and for receiving commands thereto; at least one remotely controllable valve means, associated with at least one of such utility metrology means and its associated endpoint device, for alternately closing and opening the flow of a utility supply associated with such at least one utility metrology means at its respective location in response to command signals transmitted to its associated endpoint device, such valve means including feedback means for transmitting data regarding the status of such valve means; a main communications network for bidirectional communications with such endpoint devices; and a head end processor for bidirectional communications with such main communications network, such that utility consumption data and valve status data are communicated with such head end processor via such main communications network.

A present variation to such exemplary system may further include a mobile device in RF communication with other components of such system, for controllably receiving utility consumption data and valve status data, and for selectively sending command signals to such valve means at a respective location thereof; and wherein such head end processor selectively may send commands signals to such valve means at a respective location thereof.

Per other present variations, such utility consumption may comprise gas consumption; such utility supply may comprise a gas line associated with such utility consumption locations; and such system may further include a plurality of remotely controllable valve means, associated with at least selected of such utility metrology means and associated endpoint devices, for alternately closing and opening the flow of a utility supply associated with such selected utility metrology means at its respective location in response to command signals transmitted thereto, such valve means respectively including feedback means for transmitting data regarding the status of such valve means at a given location thereof; wherein each of such valve means respectively may include a stepper motor driven valve, inline with such gas line, and a drive circuit for each associated stepper motor, with such drive circuit receiving command signals via its associated endpoint, and such feedback means respectively may include an optical sensor for counting turns of its associated stepper motor and providing an output of such counts to its associated endpoint by which the status of such associated valve means can be tracked and reported.

Other present alternative systems may further include at least one collector, for bidirectional communications with such endpoint devices and such main communications network; and a plurality of remotely controllable valve means, associated with at least selected of such utility metrology means and associated endpoint devices, for alternately closing and opening the flow of a utility supply associated with such selected utility metrology means at its respective location in response to command signals transmitted thereto, such valve means respectively including feedback means for transmitting data regarding the status of such valve means at a given location thereof; wherein such utility consumption may comprise one of gas and water consumption. For further such alternative systems, such utility consumption may comprise gas consumption; such system further may include a plurality of telemetry devices respectively associated with a plurality of utility consumption locations, each of such telemetry devices monitoring for a preselected condition at its respective location, and transmitting data to such head end processor related to such preselected condition; and such telemetry devices respectively may include alarm means for forwarding alarm signaling to such head end processor whenever monitored conditions thereat fall outside set parameters.

Yet other present alternative exemplary systems may further include a plurality of remotely controllable valve means, associated with at least selected of such utility metrology means and associated endpoint devices, for alternately closing and opening the flow of a utility supply associated with such selected utility metrology means at its respective location in response to command signals transmitted thereto, such valve means respectively including feedback means for transmitting data regarding the status of such valve means at a given location thereof; wherein such utility consumption may comprise gas consumption; such utility metrology means may comprise respective gas meters; such utility supply may comprise a gas line associated with such utility consumption locations. Preferably for such variation, such valve means respectively may comprise a controllable valve inline with such supply gas line and associated with its respective endpoint device, a stepper motor for selectively driving its associated controllable valve, and a sensor for monitoring operation of its associated stepper motor, and providing an output to its associated endpoint by which the status of such associated valve means can be tracked and reported.

Per still other present alternatives, such head end processor further may include data management means, for storing and processing utility consumption data; and such main communications network may comprise one of a WAN, a wireless network, and the internet.

Other present alternative systems may further include at least one collector, for bidirectional communications with such endpoint devices and such main communications network; a plurality of remotely controllable valve means, associated with at least selected of such utility metrology means and associated endpoint devices, for alternately closing and opening the flow of a utility supply associated with such selected utility metrology means at its respective location in response to command signals transmitted thereto, such valve means respectively including feedback means for transmitting data regarding the status of such valve means at a given location thereof; and a mobile device in RF communication with other components of such system, for controllably receiving utility consumption data and valve status data, and for selectively sending command signals to such valve means at a respective location thereof. Further, preferably for such alternative, such utility consumption may comprise gas consumption; such utility metrology means may comprise respective gas meters; such utility supply may comprise a gas line associated with such utility consumption locations; such head end processor further may include data management functionality, for storing and processing utility consumption data; such main communications network may comprise one of a WAN, a wireless network, and the internet; and such valve means respectively may comprise controllable valves inline with such supply gas line and associated with its respective endpoint device, and sensors for monitoring the positions of its associated valve, and providing an output to its associated endpoint by which the status of such associated valve means can be tracked and reported.

Another present exemplary embodiment of the present subject matter relates to a bidirectional gas AMI network for transmitting commands and gas supply related data between user locations and a centralized data collection facility. Preferably, such present exemplary network comprises a plurality of combined gas metrology/endpoint devices for obtaining and transmitting gas usage data associated with its respective location, such endpoint devices providing bidirectional RF communications from its respective location; a plurality of remotely controllable valve means, associated with at least selected of such utility metrology means and associated endpoint devices, for alternately closing and opening gas supply associated with such selected utility metrology means at its respective location in response to command signals transmitted thereto, such valve means respectively including feedback means for transmitting data regarding the status of such valve means at a given location thereof; a main communications network for bidirectional communications with such endpoint devices; a mobile device in RF communication with other components of such system, for controllably receiving gas supply related data and valve status data, and for selectively sending command signals to such valve means at a respective location thereof; and a centralized data collection facility in bidirectional communications with such main communications network, such that gas supply related data, valve status data, and command signals are communicated with such centralized data collection facility via such main communications network.

Per some present alternatives of such network, such valve means respectively may comprise a controllable valve inline with such gas supply and associated with its respective endpoint device at a given location thereof, a stepper motor for selectively driving its associated controllable valve, and an optical sensor for counting turns of its associated stepper motor and providing an output of such counts to its associated endpoint, and wherein such associated endpoint further may include a microcontroller for processing the associated optical sensor output by which the status of such associated valve means can be tracked and reported.

Yet other present alternative exemplary networks may further include a plurality of data collection devices, for bidirectional communications with selected of such endpoint devices and such main communications network; and wherein such centralized data collection facility may include a head end processor having meter data management means for storing and processing data received via such network; and such main communications network may comprise one of a WAN, a wireless network, and the internet.

Further embodiments of the present subject matter may equally relate to corresponding and/or related methodology. One present example thereof relates to a method for gathering data for monitoring gas consumption and gas supply conditions associated with selected locations along a gas pipeline of a gas utility provider. Such present exemplary method preferably comprises transmitting gas consumption data from a plurality of endpoint devices associated with respective locations of gas utility usage; communicating such data to a central location via a main communications network; providing controllable shut-off valves at selected locations of gas utility usage, associated with respective endpoints, and responsive to control signals transmitted thereto via such associated endpoints for valve activation to change between respective opened and closed positions thereof; and monitoring the positioning of the shut-off valves and providing feedback thereon to the central location via the main communications network, whereby positive feedback on completion of valve activations can be monitored and centrally reported to a gas utility provider.

Exemplary variation of such present methodology further includes transmitting such control signals to selected shut-off valves from either such central location via the main communications network or from a mobile device selectively providing RF communications.

Per other present variations, such monitoring may include detecting failure of a shut-off valve to close as commanded by a control signal; and such providing feedback may include reporting such failure to the central location. In other present variations, such monitoring may include detecting completion of a shut-off valve closure as commanded by a control signal; and such providing feedback may include reporting such completion to the central location.

In yet other present alternatives, such valve activation may include selectively driving a stepper motor associated with a gas pipeline inline valve, for controllably opening or closing such valve as commanded by a control signal. In certain of such variations, such providing feedback may include sensing and counting revolutions of such stepper motor. In certain other of such variations, such selectively driving may include selectively controlling the mode of operation of such stepper motor, so as to more fully seat a closure operation by an associated valve by switching to torque mode operation, and to more efficiently use power for such stepper motor by switching to a wave mode of operation thereof.

In still other alternatives, exemplary methods may further include monitoring for a preselected condition at selected locations; transmitting data to such central location related to such preselected condition; and forwarding alarm signaling to such central location whenever such monitored conditions at a selected location fall outside set parameters.

Yet further alternative present methods may further include conducting data management at the central location, for storing and processing gas consumption data received thereat via the network; and wherein the network at least in part may comprise one of a WAN, a wireless network, and the internet.

Additional objects and advantages of the present subject matter are set forth in, or will be apparent to, those of ordinary skill in the art from the detailed description herein. Also, it should be further appreciated that modifications and variations to the specifically illustrated, referred and discussed features, elements, and steps hereof may be practiced in various embodiments and uses of the present subject matter without departing from the spirit and scope of the subject matter. Variations may include, but are not limited to, substitution of equivalent means, features, or steps for those illustrated, referenced, or discussed, and the functional, operational, or positional reversal of various parts, features, steps, or the like.

Still further, it is to be understood that different embodiments, as well as different presently preferred embodiments, of the present subject matter may include various combinations or configurations of presently disclosed features, steps, or elements, or their equivalents (including combinations of features, parts, or steps or configurations thereof not expressly shown in the figures or stated in the detailed description of such figures). Additional embodiments of the present subject matter, not necessarily expressed in the summarized section, may include and incorporate various combinations of aspects of features, components, or steps referenced in the summarized objects above, and/or other features, components, or steps as otherwise discussed in this application. Those of ordinary skill in the art will better appreciate the features and aspects of such embodiments, and others, upon review of the remainder of the specification.

BRIEF DESCRIPTION OF THE DRAWINGS

A full and enabling disclosure of the present subject matter, including the best mode thereof, directed to one of ordinary skill in the art, is set forth in the specification, which makes reference to the appended figure, in which.

Repeat use of reference characters throughout the present specification and appended drawings is intended to represent same or analogous features, elements, or steps of the present subject matter.

DETAILED DESCRIPTION OF THE PREFERRED EMBODIMENTS

As discussed in the Summary of the Invention section, the present subject matter is particularly concerned with apparatus and methodologies for providing a positive indication of gas-flow valve position in a gas distribution system.

Selected combinations of aspects of the disclosed technology correspond to a plurality of different embodiments of the present subject matter. It should be noted that each of the exemplary embodiments presented and discussed herein should not insinuate limitations of the present subject matter. Features or steps illustrated or described as part of one embodiment may be used in combination with aspects of another embodiment to yield yet further embodiments. Additionally, certain features may be interchanged with similar devices or features not expressly mentioned which perform the same or similar function.

Figure 1:
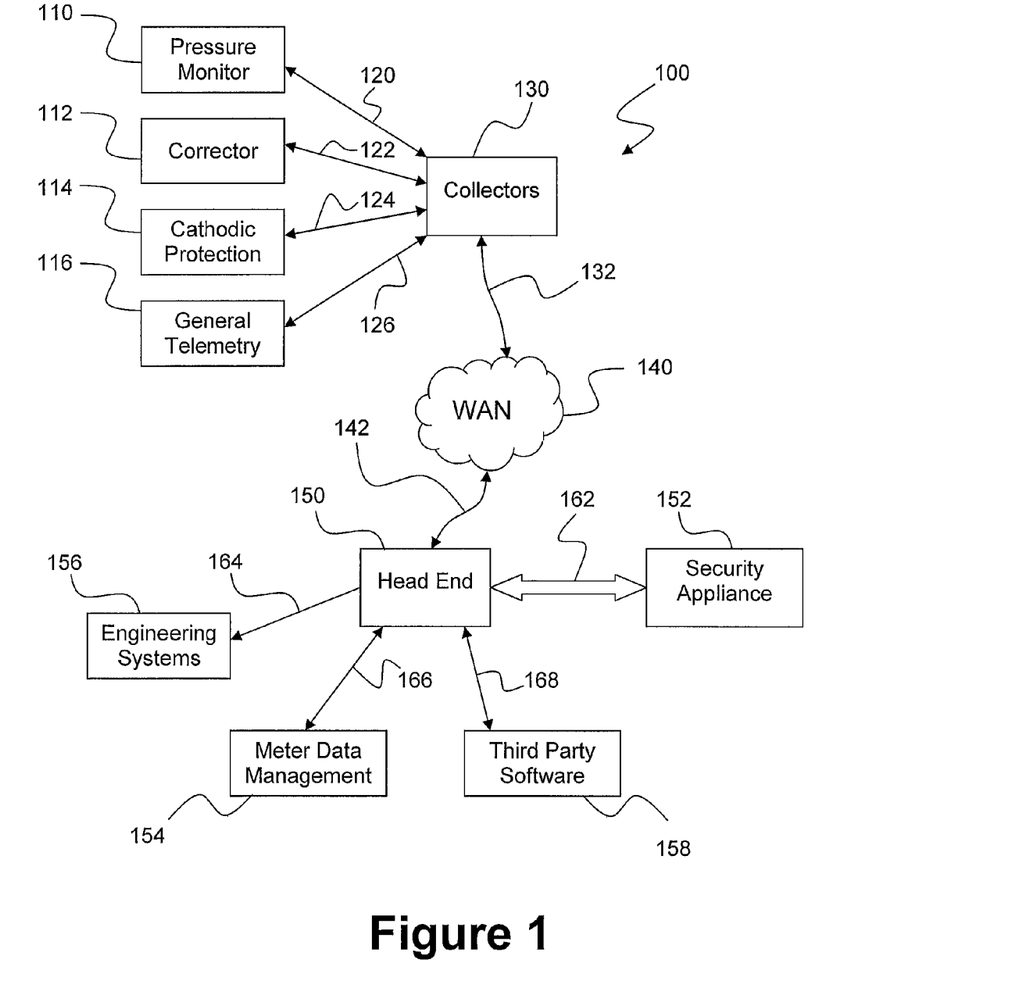
FIG. 1 is a block diagram of an exemplary telemetry system for use in accordance with the present subject matter.

Reference is made in detail to the presently preferred embodiments of a subject telemetry system with which communications of the present subject matter may be practiced. Referring now to the drawings, FIG. 1 illustrates an exemplary telemetry system generally 100, which may include various exemplary telemetry endpoints 110, 112, 114, and 116 located within, for example, a Gas AMI network, and which are read by network collectors 130. Telemetry endpoints may include, but are not limited to, a pressure monitor 110, a data corrector 112, cathodic protection apparatus 114, and general telemetry apparatus 116. Such exemplary telemetry endpoints 110, 112, 114, and 116 may be connected for data transmission via transmission paths 120, 122, 124, and 126, respectively, to collectors 130.

It should be appreciated that while transmission paths 120, 122, 124, and 126 are presently illustrated as transmission lines, such is not a specific limitation of the present technology as data may be transmitted by any suitable technology, including via wired as well as wireless technology. In similar fashion, transmission paths 162, 164, 166, and 168 (illustrated as variously coupled data between head end associated items) may also correspond to any suitable data transmission capable device or methodology, now existing or later developed.

Those of ordinary skill in the art will appreciate that the illustration in FIG. 1 with respect to the network configuration is exemplary and that other components, for example, but not limited to, repeaters, may also be employed. It should be appreciated that while the present subject matter is described more specifically as directed to gas AMI networks, such is not a specific limitation of the disclosure as the present disclosure may be extended to water and electric networks, as applicable, particularly as to selected portions of the present disclosure.

Further, while the present communications system is described as a network, other and additional communication forms including the use of mobile data collection apparatus may be employed within the scope of the present disclosure. Still further, while the present disclosure describes the use of a WAN to transmit information (either data or instructions) among selected devices, such is illustrative only as other information exchange apparatus may be used to provide desired communications including, but not limited to, WAN's, LAN's, all varieties of wireless systems, and the Internet, and intended to include other later developed technologies.

In accordance with present exemplary disclosure, information from such exemplary endpoints 110, 112, 114, and 116 may be processed in the collectors 130 and sent over a WAN generally 140 to a head end system generally 150 by way of exemplary transmission paths 132, 142. The head end system 150 may further process the endpoint reading or data and send that information to other systems. Long-term storage can, of course, be provided by, for example, a meter data management (MDM) system generally 154, not presently illustrated in detail, and details of which form no particular aspect of the present subject matter. Such system 154 may also be considered as meter data management means associated with the head end or centralized data collection facility, for storing and processing data received via the telemetry system generally 100. For telemetry, there may be other systems that are not part of an AMR/AMI network, such as engineering systems generally 156 that monitor distribution system pressure, or software systems generally 158 provided by the manufacturer of the correctors 112 or other components monitored by the endpoints. Other systems, not presently illustrated, may also be included in system 100. Also, the representative endpoints 110, 112, 114, and 116 are intended to be understood by those of ordinary skill in the art as representing any number of such endpoints in use in a given system configuration in accordance with present subject matter, variously and respectively associated with collectors as needed.

Endpoints 110, 112, 114, and 116 "bubble-up" readings of the telemetry data periodically as needed for measurement resolution and network reliability. As described, for example, in U.S. Pat. No. 7,298,288 B2, assigned to the owner of the present technology, battery-powered endpoints have been designed to limit the power consumed in day-to-day operation. One known design feature is a bubble-up mode of operation, in which an endpoint "bubbles-up," or activates its transceiver to communicate or attempt to communicate with the AMR data collection system, according, for example, to a preset schedule. The time duration or period between bubble-up events may typically span seconds or minutes.

Endpoints 110, 112, 114, and 116 may also contain alarm thresholds. Per the present subject matter, when such thresholds are exceeded, the associated endpoint will initiate an alarm to relatively rapidly indicate an over/under threshold situation to the head end 150. Such alarms may take the form of special messages and may be sent at a higher frequency than normal transmissions to ensure rapid and reliable delivery. Parameters stored in collectors 130 may also be changed through the use of two-way commands from the system head end 150 down to the collectors. Thought of in different terms, it is to be understood that all such various alarm features may be considered as being alarm means for forwarding alarm signaling whenever monitored conditions thereat fall outside set parameters (whether initially set or subsequently reset).

Collectors 130 validate the readings from the endpoints 110, 112, 114, and 116 and prioritize the uploading of data to the head end 150. Collectors 130 can also evaluate data from the endpoints 110, 112, 114, and 116 and generate alarms as well, per the present subject matter.

At head end 150, data is further validated, alarms may also be generated, and alarms and data are exported to an external system. Head end 150 can also accept requests from an external system (not presently illustrated) to send reconfiguration messages through the network to the endpoints 110, 112, 114, and 116, all per the present subject matter.

Figure 2:
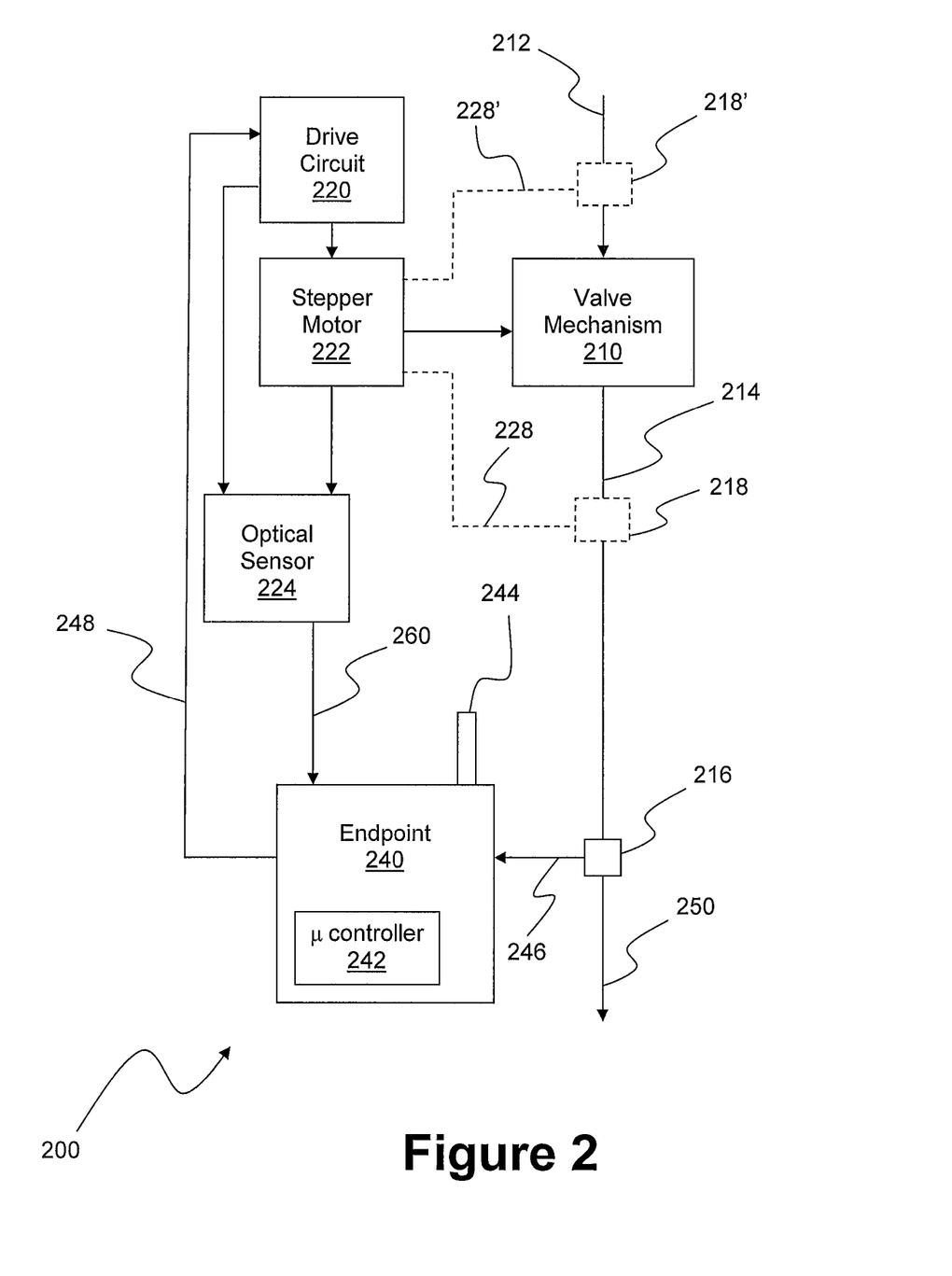
FIG. 2 is a block diagram of a valve and operating system in accordance with present technology.

With reference now to FIG. 2, there is illustrated a block diagram of an valve and endpoint device 200 constructed in accordance with the present subject matter to provide feedback from a gas shut-off valve mechanism 210 to a gas distribution system operator. Such arrangement advantageously positively indicates to the gas distribution system operator the operational state of the valve mechanism 210 located at a given system endpoint 240. In the presently illustrated exemplary embodiment, gas input line 212 is coupled from a gas supply (not separately illustrated) to valve mechanism 210 which controls flow of gas to a consumer's connection 250 by way of connection line 214 and metering device 216. Valve mechanism 210 may employ a rubber plug or equivalent (not separately illustrated) that closes over input line 212 to control gas flow. Thought of in other present terms, such valve mechanism 210 and related functionality may be thought of as comprising remotely controllable valve means, associated with at least one of such utility metrology means and its associated endpoint device, for alternately closing and opening the flow of a utility supply associated with such at least one utility metrology means at its respective location in response to command signals transmitted to its associated endpoint device. Further, the herein-referenced description of feedback functionality and related may be thought of as such valve means including feedback means for transmitting data regarding the status of such valve means.

Additionally, a pressure regulating device 218 may be provided between valve mechanism 210 and metering device 216 or, alternately may be provided in line 212 at alternate regular location 218' upstream of valve mechanism 210. Alternatively still, valve mechanism 210 may be incorporated into or associated with either of pressure regulator 218 or 218' and controlled via couplings 228 and 228', respectively, from stepper motor 222.

Metering device 216 (details of which form no particular aspect of the present subject matter) may provide data, for example, in the form of pulses to endpoint 240 via line 246 (which together with related functionality may also be regarded as being utility metrology means). It is to be understood that such line 246 (and other "lines" referenced herein) may variously involve hardwired or wireless configurations, now or later existing. Such pulse data along with other selected metrology information may be periodically "bubbled-up" to a network head end such as head end 150 (FIG. 1). In certain instances, the pulse count from metering device 216 may be "corrected" based on local temperature and pressure readings to insure correct pulse count based on actual volume of gas flow to the consumer.

In accordance with present technology, valve mechanism 210 may be operated between respective opened and closed positions by way of a stepper motor 222 operated under the control of a drive circuit 220 via signals over line 248 from endpoint 240. Such signals from endpoint 240 may originate from head end 150 or from a manual or mobile device (not separately illustrated) in communication with endpoint 240 via radio frequency (RF) communications coupled to endpoint 240 via representative antenna 244. Communication from head end 150 may also be by way of RF communications to endpoint 240 as generally illustrated in FIG. 1 or, alternatively may be provided by other known communications methodologies including, but not limited to all types of wired and wireless communications, now or later existing. Alternatively still, a manual open or close command may be manually generated by operation of appropriate manual switches on endpoint 240 (not separately illustrated).

In accordance with exemplary operation of present technology, an optical sensor 224 may be configured to observe rotational operation of stepper motor 222 and to pass by way of line 260 a pulse count to micro-controller 242 associated with endpoint 240. Upon receiving a command from endpoint 240 (via line 248 and drive circuit 220) for the valve mechanism 210 to operate, the number of rotations of the stepper motor 222 is counted by the micro-controller 242 based on pulses from preferably optical sensor 224. If a specified number of rotations of stepper motor 222 moving valve mechanism 210 either from an opened to closed, or from a closed to opened position, is counted, then valve mechanism 210 is deemed to be opened or closed depending on the command operation sent to stepper motor 222. If, however, stepper motor 222 stops rotation before reaching the specified number of rotations, a signal is sent by way of micro-controller 242 and endpoint 240 to head end 150 and, thereby, to the system operator, to indicate a fault condition.

Further in accordance with present technology, the present exemplary feedback features/mechanism serves a second purpose as well. As is generally understood, stepper motors such as stepper motor 222 may operate under two different modes of operation, i.e., a wave mode and a torque mode. Wave mode is a high-speed operation which generally uses less current than torque mode. In accordance with present technology, when an actuation command is received at endpoint 240 and passed to drive circuit 220, such circuit is configured to first unseat valve mechanism 210 by operating stepper motor 222 using its torque mode. Once stepper motor 222 starts turning, it can be operated in its wave mode in order to use less current, thereby saving associated battery life in accordance with the present subject matter.

When stepper motor 222 reaches the end of its travel and stops turning, stepper motor 222 can be changed back to torque mode for a few steps in order to more fully seat valve mechanism 210, to better ensure that the valve is closed, again in accordance with present subject matter.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. An advanced meter reading system for transmitting between user locations and a centralized data collection facility data and commands related to utility usage and utility supply connections, said system comprising:
   a plurality of utility metrology means and associated endpoint devices, situated at respective locations of utility consumption, for bidirectional communications for transmitting utility consumption data associated with a respective location and for receiving commands thereto;
   at least one remotely controllable valve means, associated with at least one of said utility metrology means and its associated endpoint device, for alternately closing and opening the flow of a utility supply associated with said at least one utility metrology means at its respective location in response to command signals transmitted to its associated endpoint device, said valve means including feedback means for transmitting data regarding the status of said valve means;
   a main communications network for bidirectional communications with said endpoint devices; and
   a head end processor for bidirectional communications with said main communications network, such that utility consumption data and valve status data are communicated with said head end processor via said main communications network,
   wherein said at least one remotely controllable valve means includes a stepper motor driven valve, and said feedback means includes an optical sensor associated with said stepper motor driven valve for counting turns of its associated stepper motor and providing an output of such counts to its associated endpoint by which the status of such associated valve means can be tracked and reported.

2. An advanced meter reading system as in claim 1, further including:
   a mobile device in RF communication with other components of said system, for controllably receiving utility consumption data and valve status data, and for selectively sending command signals to said valve means at a respective location thereof; and
   wherein said head end processor selectively sends commands signals to said valve means at a respective location thereof.

3. An advanced meter reading system as in claim 1, wherein:
   said utility consumption comprises gas consumption;
   said utility supply comprises a gas line associated with said utility consumption locations; and
   said system further includes a plurality of remotely controllable valve means, associated with at least selected of said utility metrology means and associated endpoint devices, for alternately closing and opening the flow of a utility supply associated with said selected utility metrology means at its respective location in response to command signals transmitted thereto, said valve means respectively including feedback means for transmitting data regarding the status of such valve means at a given location thereof;
   wherein each of said valve means respectively includes a stepper motor driven valve, inline with said gas line, and a drive circuit for each associated stepper motor, with such drive circuit receiving command signals via its associated endpoint, and said feedback means respectively includes an optical sensor for counting turns of its associated stepper motor and providing an output of such counts to its associated endpoint by which the status of such associated valve means can be tracked and reported.

4. An advanced meter reading system as in claim 1, further including:
   at least one collector, for bidirectional communications with said endpoint devices and said main communications network; and
   a plurality of remotely controllable valve means, associated with at least selected of said utility metrology means and associated endpoint devices, for alternately closing and opening the flow of a utility supply associated with said selected utility metrology means at its respective location in response to command signals transmitted thereto, said valve means respectively including feedback means for transmitting data regarding the status of such valve means at a given location thereof;
   wherein said utility consumption comprises one of gas and water consumption.

5. An advanced meter reading system as in claim 4, wherein:
   said utility consumption comprises gas consumption;
   said system further includes a plurality of telemetry devices respectively associated with a plurality of utility consumption locations, each of said telemetry devices monitoring for a preselected condition at its respective location, and transmitting data to said head end processor related to such preselected condition; and
   said telemetry devices respectively include alarm means for forwarding alarm signaling to said head end processor whenever monitored conditions thereat fall outside set parameters.

6. An advanced meter reading system as in claim 1, further including:
   a plurality of remotely controllable valve means, associated with at least selected of said utility metrology means and associated endpoint devices, for alternately closing and opening the flow of a utility supply associated with said selected utility metrology means at its respective location in response to command signals transmitted thereto, said valve means respectively including feedback means for transmitting data regarding the status of such valve means at a given location thereof;
   wherein said utility consumption comprises gas consumption;
   said utility metrology means comprise respective gas meters;
   said utility supply comprises a gas line associated with said utility consumption locations; and
   said valve means respectively comprise a controllable valve inline with such supply gas line and associated with its respective endpoint device, a stepper motor for selectively driving its associated controllable valve, and a sensor for monitoring operation of its associated stepper motor, and providing an output to its associated endpoint by which the status of such associated valve means can be tracked and reported.

7. An advanced meter reading system as in claim 1, wherein:

said head end processor further includes data management means, for storing and processing utility consumption data; and said main communications network comprises one of a WAN, a wireless network, and the internet.

8. An advanced meter reading system as in claim 1, further including:

at least one collector, for bidirectional communications with said endpoint devices and said main communications network;

a plurality of remotely controllable valve means, associated with at least selected of said utility metrology means and associated endpoint devices, for alternately closing and opening the flow of a utility supply associated with said selected utility metrology means at its respective location in response to command signals transmitted thereto, said valve means respectively including feedback means for transmitting data regarding the status of such valve means at a given location thereof; and a mobile device in RF communication with other components of said system, for controllably receiving utility consumption data and valve status data, and for selectively sending command signals to said valve means at a respective location thereof;

wherein said utility consumption comprises gas consumption;

said utility metrology means comprise respective gas meters;

said utility supply comprises a gas line associated with said utility consumption locations;

said head end processor further includes data management functionality, for storing and processing utility consumption data;

said main communications network comprises one of a WAN, a wireless network, and the internet; and said valve means respectively comprise controllable valves inline with such supply gas line and associated with its respective endpoint device, and sensors for monitoring the positions of its associated valve, and providing an output to its associated endpoint by which the status of such associated valve means can be tracked and reported.

9. A bidirectional gas AMI network for transmitting commands and gas supply related data between user locations and a centralized data collection facility, said network comprising:

a plurality of combined gas metrology/endpoint devices for obtaining and transmitting gas usage data associated with its respective location, said endpoint devices providing bidirectional RF communications from its respective location;

a plurality of remotely controllable valve means, associated with at least selected of said utility metrology means and associated endpoint devices, for alternately closing and opening gas supply associated with said selected utility metrology means at its respective location in response to command signals transmitted thereto, said valve means respectively including feedback means for transmitting data regarding the status of such valve means at a given location thereof;

a main communications network for bidirectional communications with said endpoint devices;

a mobile device in RF communication with other components of said system, for controllably receiving gas supply related data and valve status data, and for selectively sending command signals to said valve means at a respective location thereof;

a centralized data collection facility in bidirectional communications with said main communications network, such that gas supply related data, valve status data, and command signals are communicated with said centralized data collection facility via said main communications network;

wherein said plurality of remotely controllable valve means is configured to be driven by a stepper motor for selectively driving its associated controllable valve; and wherein said feedback means is an optical sensor for counting turns of its associated stepper motor and providing an output of such counts to its associated endpoint.

10. A network as in claim 9, wherein said valve means respectively comprise:

a controllable valve inline with such gas supply and associated with its respective endpoint device at a given location thereof, wherein such associated endpoint further includes a microcontroller for processing the associated optical sensor output by which the status of such associated valve means can be tracked and reported.

11. A network as in claim 9, further including:

a plurality of data collection devices, for bidirectional communications with selected of said endpoint devices and said main communications network; and wherein said centralized data collection facility includes a head end processor having meter data management means for storing and processing data received via said network; and said main communications network comprises one of a WAN, a wireless network, and the internet.

12. A method for gathering data for monitoring gas consumption and gas supply conditions associated with selected locations along a gas pipeline of a gas utility provider, such method comprising:

transmitting gas consumption data from a plurality of endpoint devices associated with respective locations of gas utility usage;

communicating such data to a central location via a main communications network;

providing controllable shut-off valves at selected locations of gas utility usage, associated with respective endpoints, and responsive to control signals transmitted thereto via such associated endpoints for valve activation to change between respective opened and closed positions thereof; and monitoring the positioning of the shut-off valves and providing feedback thereon to the central location via the main communications network, whereby positive feedback on completion of valve activations can be monitored and centrally reported to a gas utility provider;

wherein such valve activation includes selectively driving a stepper motor associated with a gas pipeline inline valve, for controllably opening or closing such valve as commanded by a control signal, and such providing feedback includes sensing and counting revolutions of such stepper motor.

13. A method as in claim 12, further including transmitting such control signals to selected shut-off valves from either such central location via the main communications network or from a mobile device selectively providing RF communications.

14. A method as in claim 12, wherein:
such monitoring includes detecting failure of a shut-off valve to close as commanded by a control signal; and
such providing feedback includes reporting such failure to the central location.

15. A method as in claim 12, wherein:
such monitoring includes detecting completion of a shut-off valve closure as commanded by a control signal; and
such providing feedback includes reporting such completion to the central location.

16. A method as in claim 12, wherein such selectively driving includes selectively controlling the mode of operation of such stepper motor, so as to more fully seat a closure operation by an associated valve by switching to torque mode operation, and to more efficiently use power for such stepper motor by switching to a wave mode of operation thereof.

17. A method as in claim 12, further including:
monitoring for a preselected condition at selected locations;
transmitting data to such central location related to such preselected condition; and
forwarding alarm signaling to such central location whenever such monitored conditions at a selected location fall outside set parameters.

18. A method as in claim 12, further including:
conducting data management at the central location, for storing and processing gas consumption data received thereat via the network; and
wherein the network at least in part comprises one of a WAN, a wireless network, and the internet.

* * * * *